US008356458B2

United States Patent
Rübsaamen et al.

(10) Patent No.: US 8,356,458 B2
(45) Date of Patent: Jan. 22, 2013

(54) LOADING AND PALLETIZING DEVICE FOR ROLL TRUCKS, SUCH AS DOLLIES, AND THE ASSOCIATED METHOD

(75) Inventors: Martin Rübsaamen, Bad Dürkheim (DE); Joachim Junghans, Frankfurt (DE); Stefan Schmitt, Bermersheim (DE)

(73) Assignee: KHS GmbH (DE)

( * ) Notice: Subject to any disclaimer, the term of this patent is extended or adjusted under 35 U.S.C. 154(b) by 542 days.

(21) Appl. No.: 12/570,748

(22) Filed: Sep. 30, 2009

(65) Prior Publication Data
US 2010/0083617 A1 Apr. 8, 2010

Related U.S. Application Data

(63) Continuation-in-part of application No. PCT/EP2008/002176, filed on Mar. 19, 2008.

(30) Foreign Application Priority Data

Mar. 30, 2007 (DE) .......................... 10 2007 015 751

(51) Int. Cl.
*B65B 35/50* (2006.01)
(52) U.S. Cl. ................. 53/447; 53/531; 53/540; 53/541
(58) Field of Classification Search .................... 53/397, 53/461, 447, 531, 540, 541; 414/797.4, 797.5, 414/927, 929, 802
See application file for complete search history.

(56) References Cited

U.S. PATENT DOCUMENTS

| 2,701,650 | A | * | 2/1955 | Stevenson, III | 53/496 |
| 3,389,810 | A | * | 6/1968 | Wolfe et al. | 414/791.7 |
| 3,612,300 | A | * | 10/1971 | Berghgracht | 414/792.2 |
| 3,623,618 | A | * | 11/1971 | Shaw | 414/797.7 |
| 3,730,357 | A | * | 5/1973 | Beaty et al. | 414/788.9 |
| 3,757,971 | A | * | 9/1973 | Frish | 414/797.5 |
| 3,799,717 | A | * | 3/1974 | Nedoh | 425/125 |
| 3,934,736 | A | | 1/1976 | Thomas | |
| 3,986,620 | A | * | 10/1976 | Wilde et al. | 414/790.4 |
| 4,082,194 | A | * | 4/1978 | Sheehan | 414/792 |
| 4,252,484 | A | * | 2/1981 | Benson et al. | 414/795.6 |
| 4,302,142 | A | * | 11/1981 | Kuhl et al. | 414/795.8 |
| 4,567,979 | A | | 2/1986 | Hoehn | |
| 4,568,231 | A | * | 2/1986 | Czajka et al. | 414/788.4 |

(Continued)

FOREIGN PATENT DOCUMENTS

| DE | 34 42 111 C2 | 7/1986 |
| EP | 0 251 439 A | 1/1988 |
| EP | 1 149 753 A | 10/2001 |

OTHER PUBLICATIONS

International Search Report PCT/EP2008/002176 and English translation thereof.

*Primary Examiner* — Hemant M Desai
*Assistant Examiner* — Gloria R Weeks
(74) *Attorney, Agent, or Firm* — Nils H. Ljungman & Associates (57) ABSTRACT

Loading arrangement for loading dollies which has a transport station for placing at least two dollies one behind another along their line of transport. The loading arrangement also has movable transport element with engaging structures, which engaging structures are configured to engage and move the dollies to position the dollies at a predetermined distance from one another at a loading station. The dollies are then loaded at the same time at the loading station before the engaging structures move the dollies to a transfer station which transfers loaded dollies out of the loading arrangement.

18 Claims, 5 Drawing Sheets

U.S. PATENT DOCUMENTS

| | | | |
|---|---|---|---|
| 4,640,459 A * | 2/1987 | Hetemaa et al. | 238/122 |
| 4,678,390 A * | 7/1987 | Bonneton et al. | 414/282 |
| 4,701,092 A * | 10/1987 | Reynaud et al. | 414/796.1 |
| 5,033,935 A * | 7/1991 | Decrane | 414/798.1 |
| 5,096,369 A * | 3/1992 | Ouellette | 414/788.7 |
| 5,195,630 A | 3/1993 | Donovan et al. | |
| 5,203,666 A * | 4/1993 | Mojden et al. | 414/416.07 |
| 5,261,781 A * | 11/1993 | Bandy | 414/791.6 |
| 5,437,533 A * | 8/1995 | VanderMeer et al. | 414/789.5 |
| 5,480,280 A * | 1/1996 | Bordon | 414/798.1 |
| 5,487,637 A * | 1/1996 | Mojden et al. | 414/788.4 |
| 5,597,284 A * | 1/1997 | Weltlich et al. | 414/791.1 |
| 5,623,808 A * | 4/1997 | Franklin et al. | 53/399 |
| 5,882,174 A * | 3/1999 | Woerner et al. | 414/788.7 |
| 5,893,258 A * | 4/1999 | Lancaster, III | 53/399 |
| 5,907,946 A * | 6/1999 | Oishi et al. | 53/471 |
| 6,099,240 A * | 8/2000 | Korhonen et al. | 414/802 |
| 6,260,719 B1 * | 7/2001 | Azzopardi et al. | 211/189 |
| 6,481,186 B2 * | 11/2002 | Kokkersvold et al. | 53/447 |
| 6,637,178 B1 * | 10/2003 | Cook et al. | 53/447 |
| 6,742,459 B2 * | 6/2004 | Lucas | 108/55.1 |
| 6,865,863 B1 * | 3/2005 | Cook et al. | 53/441 |
| 6,880,311 B2 * | 4/2005 | Winkler | 53/399 |
| 7,143,567 B2 * | 12/2006 | Omo et al. | 53/443 |
| 7,596,926 B2 * | 10/2009 | Schulte et al. | 53/167 |
| 7,731,473 B2 * | 6/2010 | Yuyama et al. | 414/795.6 |
| 7,832,218 B2 * | 11/2010 | Hawkins | 62/63 |
| 8,066,469 B2 * | 11/2011 | Trejo | 414/795.2 |
| 2005/0063815 A1 * | 3/2005 | Pierson et al. | 414/799 |
| 2009/0028676 A1 * | 1/2009 | Langlot et al. | 414/331.09 |
| 2010/0119348 A1 * | 5/2010 | Snapp | 414/798.1 |
| 2010/0178149 A1 * | 7/2010 | Fritzsche | 414/789.5 |

* cited by examiner

LOADING AND PALLETIZING DEVICE FOR ROLL TRUCKS, SUCH AS DOLLIES, AND THE ASSOCIATED METHOD

CONTINUING APPLICATION DATA

This application is a Continuation-In-Part application of International Patent Application No. PCT/EP2008/002176, filed on Mar. 19, 2008, which claims priority from Federal Republic of Germany Patent Application No. 10 2007 015 751.9, filed on Mar. 30, 2007. International Patent Application No. PCT/EP2008/002176 was pending as of the filing date of this application. The United States was an elected state in International Patent Application No. PCT/EP2008/002176.

BACKGROUND

1. Technical Field

The present application relates to a loading and palletizing device for roll trucks, in one possible embodiment for so-called dollies, said device comprising at least one transport section provided with at least one guide rail, in which roll trucks are displaceable, a loading station for roll trucks, in which goods can be stacked onto at least two roll trucks, one positioned behind the other, at the same time, and a transfer station, wherein a transport bar provided with entrainment means is provided in the conveying section and the entrainment means are positioned on the transport bar in such a manner that said entrainment means cause a defined spacing between the roll trucks when moving loads. In one possible embodiment, the conveying rods can be raised and lowered, the movement being such that the conveying rod is raised for the load movement and executes a lowered return movement.

2. Background Information

Background information is for informational purposes only and does not necessarily admit that subsequently mentioned information and publications are prior art.

Rolling transport systems are becoming more and more important in goods and product logistics. These are rollable pallets, so-called dollies. These small roll trucks have an area corresponding to half or quarter of the EU pallet, of the four wheels normally one pair being steering wheels which are mounted so as to be rotatable about a vertical axis. The second pair is not steerable. In the case of returnable systems, the dollies are stacked on a Europa pallet, returned to the suppliers and are then used again with new goods by said suppliers. The loaded roller trucks are assembled, secured and supplied out again on transport pallets, normally Europa pallets.

Through the small area of the roll trucks it is necessary and/or desired that the rectangular and/or plane-parallel or substantially plane-parallel goods or batches have to be secured by means of spacers and/or lateral reinforcing elements. In the case of many goods, a four-sided gripping lifting and transporting tool has to or may be used for loading the dollies, for which sufficient space has to or may be provided during the loading procedure. Consequently, for loading, it is necessary or may be desired to separate the roll trucks into single trucks in order to make the side faces accessible.

Some devices and methods include an individual loaded roller pallet is conveyed by means of a transport rod, which is provided with entrainment means. The single-item conveying and loading of a roll truck slows down the entire palletizing and depalletizing process and for the subsequent new loading of a transport pallet necessitates or may desire a costly and time-consuming method step in order, once again, to group the roll trucks loaded high with goods.

Object or Objects

It is an object of the present application, consequently, to disclose a device and a method, where a greater number of roll trucks can be loaded per unit time.

SUMMARY

This object is achieved by the present application by means of a loading and palletizing device for roll trucks, in one possible embodiment so-called dollies, said device including at least one transport section provided with at least one guide rail, in which roll trucks are displaceable, a loading station for roll trucks, in which goods can be stacked onto at least two roll trucks, one positioned behind the other, at the same time, and a transfer station in which the fully loaded roll trucks are removed, the transfer station in one possible embodiment being formed by a palletizing station in which the roll trucks are positioned on at least one pallet.

It is characteristic of the device in this case that a transport bar provided with entrainment means is provided in the conveying section, said transport bar being directly or indirectly in operative connection with a motor, pneumatic agitator, hydraulic agitator or the like and being driveable thereby, wherein the entrainment means are positioned on the transport bar in such a manner that said entrainment means cause a defined spacing between the roll trucks when moving loads. In one possible embodiment, the conveying rod can be raised and lowered, the movement being such that the conveying rod is raised for the load movement and executes a lowered return movement.

At least one possible embodiment of the present application provides arranging the conveying rod in operative connection with a chain that runs, in part, parallel or substantially parallel to the conveying rod, wherein the chain is motor-driven and drives the conveying rod. In this case the conveying rod can be guided on rollers and/or in at least one rail.

The entrainment means can have an arbitrary form and are essentially dependent on the geometry of the roll trucks. In at least one possible embodiment, the entrainment means are realized as journals, claws or the like.

In at least one possible embodiment, at least part of the entrainment means is mounted eccentrically on the conveying rod and is lowerable. This mounting arrangement means that, in the case of the return movement in opposition to the conveying direction, the conveying rod has to or may be lowered a little or the lowering can be dispensed with entirely.

In at least one possible embodiment of the present application, two or more transport sections extending in parallel or substantially parallel are provided. In this case, the number of the parallel your substantially parallel transport sections is in one possible embodiment selected in such a manner that in the associated loading station it is possible to load precisely or substantially precisely or generally the number of roll trucks that fill out the area at least of one transport pallet in an optimum manner. Consequently, for example, in the case of roll trucks that take up a quarter of the area of a Europa pallet, in one possible embodiment, two parallel or substantially parallel transport sections are provided and four roll trucks are loaded at the same time by means of the loading station.

In at least one possible embodiment of the present application, the two or more transport sections do not extend parallel or substantially parallel next to one another but, in the direction of the loading station, are spaced further apart than is the case upstream or downstream of the loading station. In this way a defined lateral spacing between roll trucks can be effected in the region of the loading station and flexible reactions to different loading conditions are possible. Downstream of the loading station, the tracks of the transport section are guided more narrowly and parallel or substantially parallel to each other once again.

Where the goods change frequently and consequently the loading requirements, it may be possible to provide flexible rail elements upstream and downstream of the loading station so that the tracks of the conveying sections can be moved towards each other horizontally and/or spaced apart in the region of the loading station by means of a drive.

In at least one possible embodiment of the present application, a depalletizing device is positioned upstream of the loading station and of the transport section. The depalletizing device serves for the layerwise removal and transferring of roll trucks to the adjacent transport section and the subsequent loading. Many devices are conceivable as a depalletizing device, the depalletizing device in one possible embodiment including a lifting device, with which the second and, where applicable, further layers of the stacked roll trucks can be lifted and lowered.

With reference to the loading station, in one possible embodiment, the loading station includes a device with which at least one stabilizing element and/or packaging material is secured on or to the goods, in one possible embodiment stabilizing elements and/or packaging materials that abut against at least one side of the goods from the outside and consequently cover a part face of the loaded goods. In this case, the term side refers to the face that extends vertically and approximately beyond the outside edges of the roll trucks.

In addition, the present application includes a method for loading roll trucks, said method including at least the conducting of roll trucks to a loading station, the loading of the roll trucks in the loading station and the removal therefrom, a loading and palletizing device in accordance with one of the aforementioned specific embodiments being used.

In one possible embodiment, the following steps are executed:

a) Advance a pallet loaded with stacked roll trucks,
b) Raise the stacked rolling truck without the first stack layer,
c) Insert at least one conveying rod under at least two roll trucks situated one behind the other,
d) Engage or attach the entrainment means in or to the rolling truck, in one possible embodiment in or to the rolling truck floor or frame,
e) Load movement of the conveying rod and of the rolling truck locked thereto to the loading station,
f) parallel or substantially parallel loading of the roll trucks,
g) Load movement of the conveying rod and of the roll trucks locked thereto to a subsequent conveying section and/or to a transfer and/or palletizing station.

The method can be improved in that in the step f), the loading of the roll trucks, in addition, at least part of the outer faces of the goods stacked on the rolling truck is covered with at least one stabilizing element and/or packaging material.

In one possible embodiment, the method is effected in that in step c) two or more conveying rods move in under roll trucks standing one behind the other, wherein in one possible embodiment the conveying rods move in in parallel or substantially parallel and entrain a full layer of roll trucks.

Consequently, by means of the present application, through the simultaneous or substantially simultaneous loading of a plurality of roll trucks, it is possible to load precisely or substantially precisely or generally the number of roll trucks that are intended for one transport pallet. In addition, in one possible embodiment of the device and of the method, the roll trucks do not have to be re-arranged, turned or regrouped, but, in continuous operation, after loading, have to be pushed onto the transport pallets standing by and secured there and, where applicable, packaged for transport.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
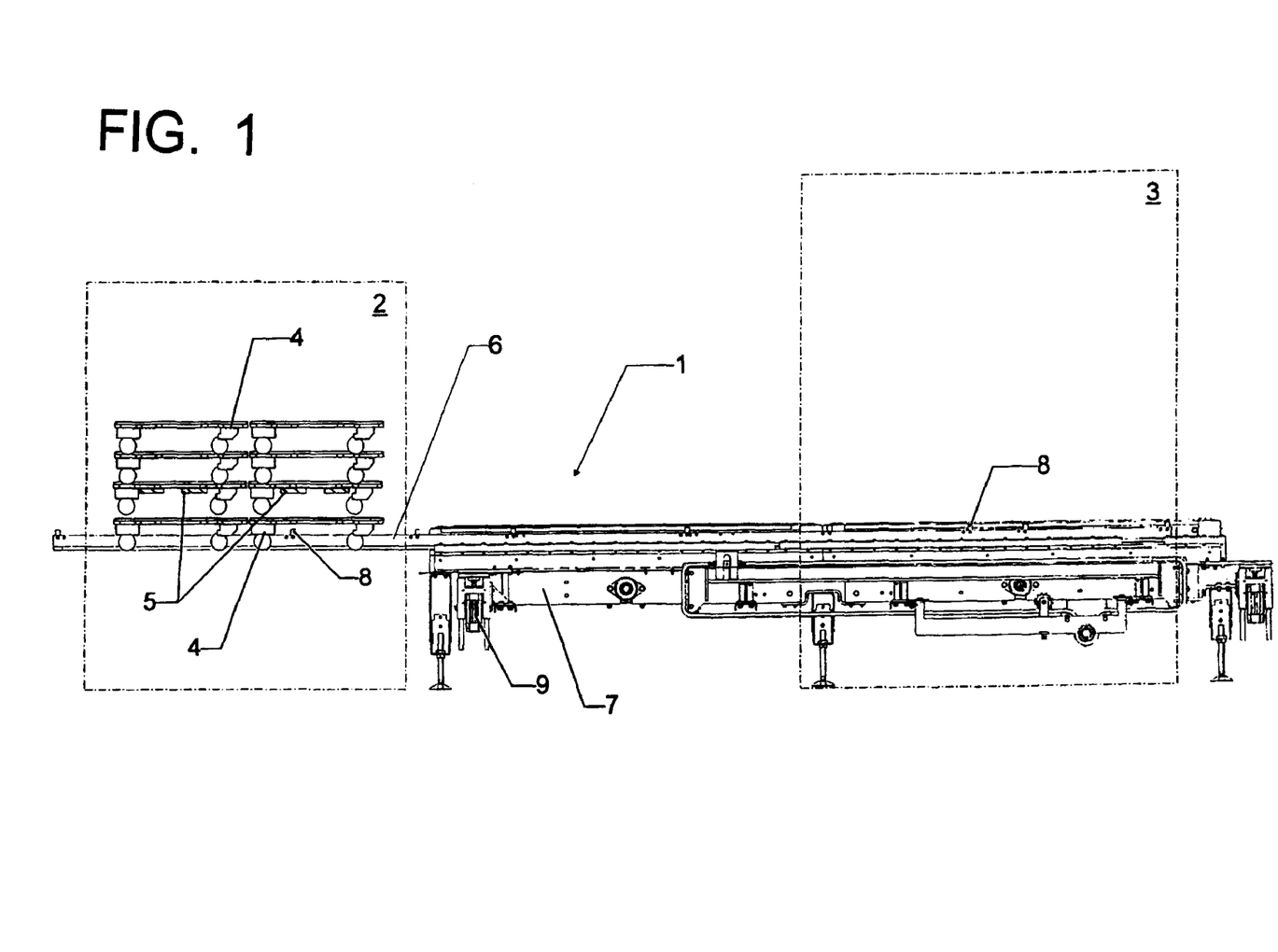
FIGS. 1 to 3 describe the device according to the present application as an example in three different stages of the method.

FIG. 1 shows the loading and palletizing device for roll trucks, given the general reference 1, a depalletizing device 2 and the loading station 3, in this case the depalletizing device 2 and the loading station 3 are indicated schematically by means of a dot dash line. Roll trucks 4 are deposited layerwise by means of the depalletizing device 2, the remaining roll trucks being lifted by means of a lifting device. The top view shows the lifting teeth 5 of the lifting device, on which the remaining roll trucks 4 rest. In the device represented, the push bar or conveying rod or transport element 6 of the conveying section 7 is guided under the roll truck 4 to be conveyed and is still situated in the lowered position so that the journal-like entrainment means 8 are still spaced apart vertically from the bottom of the rolling truck.

The transport and the transferring of the roll trucks to the conveying section 7 begins from this position by raising the conveying rod 6 and moving it in the direction of the loading station 3.

Figure 2:
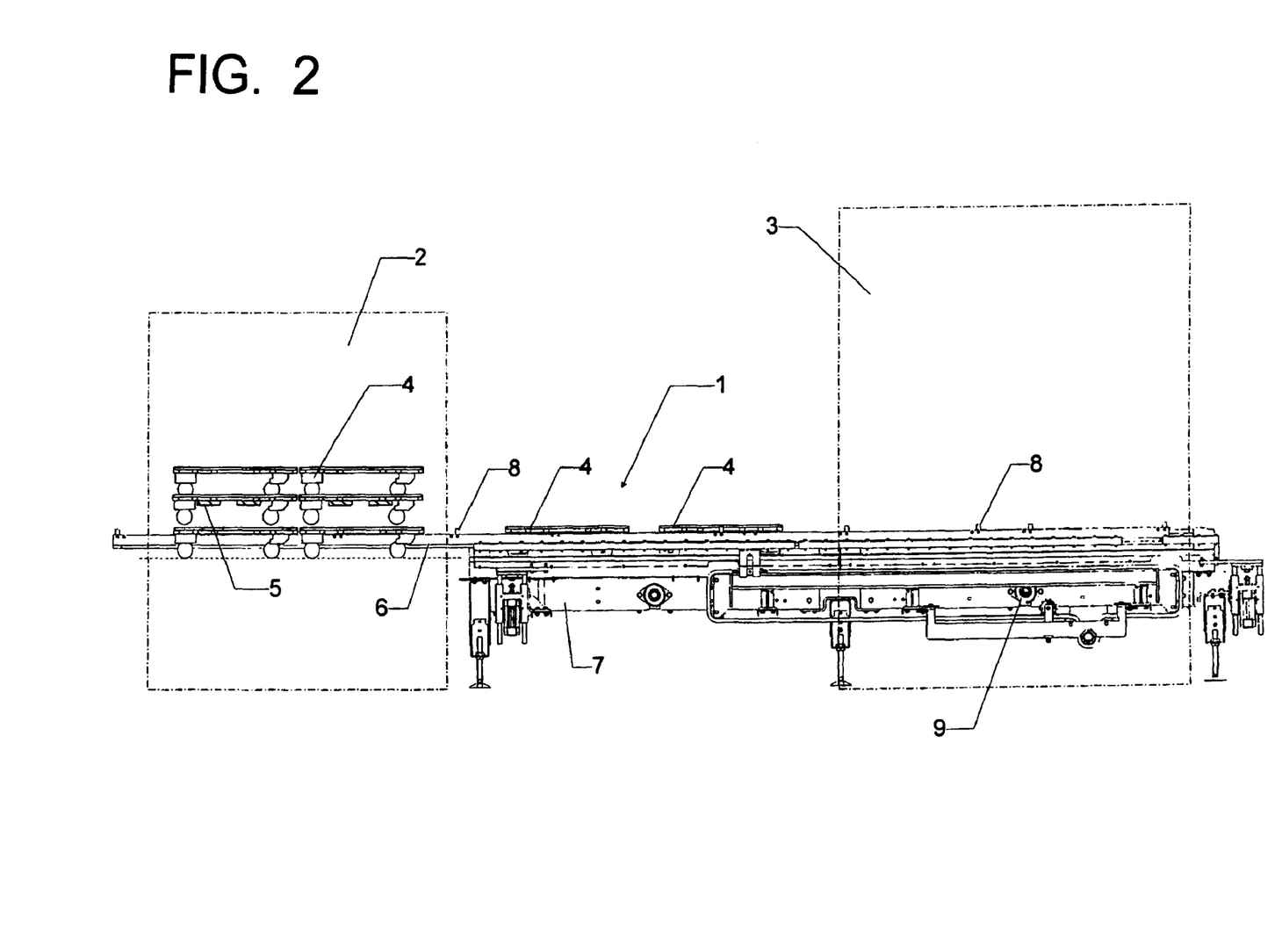

FIG. 2 shows the device in a position in which the conveying rod 6 is raised and two roll trucks 4 are situated on the conveying section 7 directly in front of the loading station 3 and two roll trucks 4 are standing by in the region of the depalletizing device 2. The transport section has two U-shaped, parallel or substantially parallel bars (not shown), in which the rollers of the roll trucks 4 are guided. It can clearly be seen that the roll trucks 4 situated on the conveying section 7 have been moved to a greater spacing apart than is the case in the region of the depalletizing device 2. This defined spacing is maintained on the entire conveying section 7.

Figure 3:
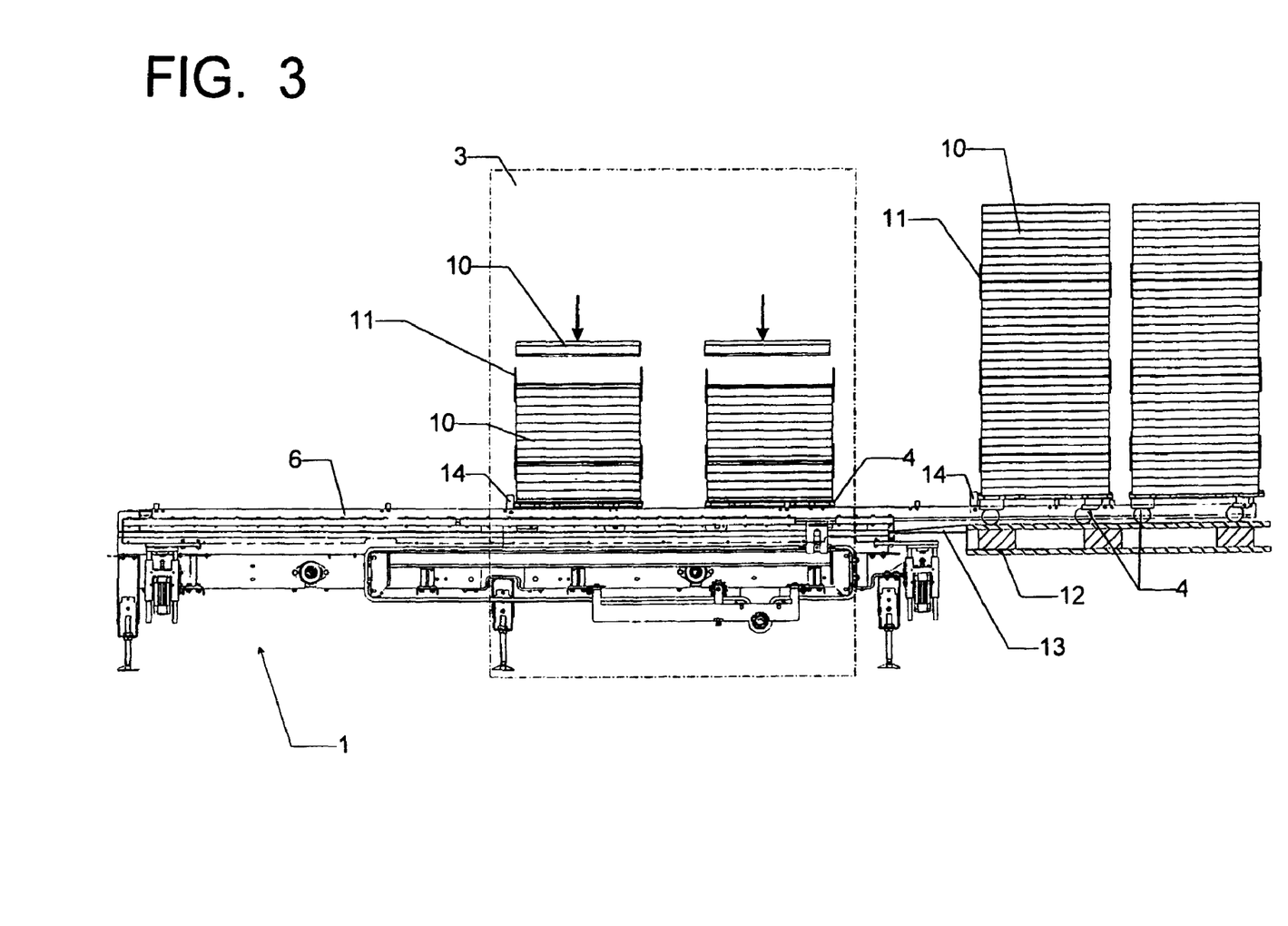

The loading of the roll trucks 4 is represented in FIG. 3. The roll trucks 4 situated in the loading station 3 are loaded up to half full with goods 10, a plurality of stabilizing elements 11 are provided for the loading. Said stabilizing elements are usually designed as flat elements and are then folded downwards at the sides in a suitable manner. In the variant represented, the stabilizing element 11 forms a double T profile through corresponding perforating and patterning in the folding process. The lifting tool is not represented for reasons of clarity, and the arrows indicate a direction of movement of the lifting tools.

A transfer station is positioned downstream of the loading station 3, in which transfer station the full roll trucks 4 are pushed onto a transport pallet 12. For this transfer, the roll trucks 4 at the end of the conveying section 7 are pushed onto a ramp 13 so that the front roll truck 4 becomes detached from the entrainment means 8 and is pushed on impact by the following roll truck 4. For the complete transfer of the following, pushing roll trucks 4, an end entrainment means 14 is provided on the conveying rod, said end entrainment means pushing the rear roll truck 4 forward as far as its end position on the pallet 12. Said end entrainment means 14 is longer than the entrainment means 8 and consequently protrudes further beyond the conveying rod 6. In the example shown, the entrainment means 8 are secured rigidly to the conveying rod 6 and the end entrainment means 14 are mounted eccentrically on the conveying rod 6 such that they fold up at the lowered return movement. The folding out of the end entrainment means 14 is triggered by a control cam (not shown) in the region of the filling station.

Figure 4:
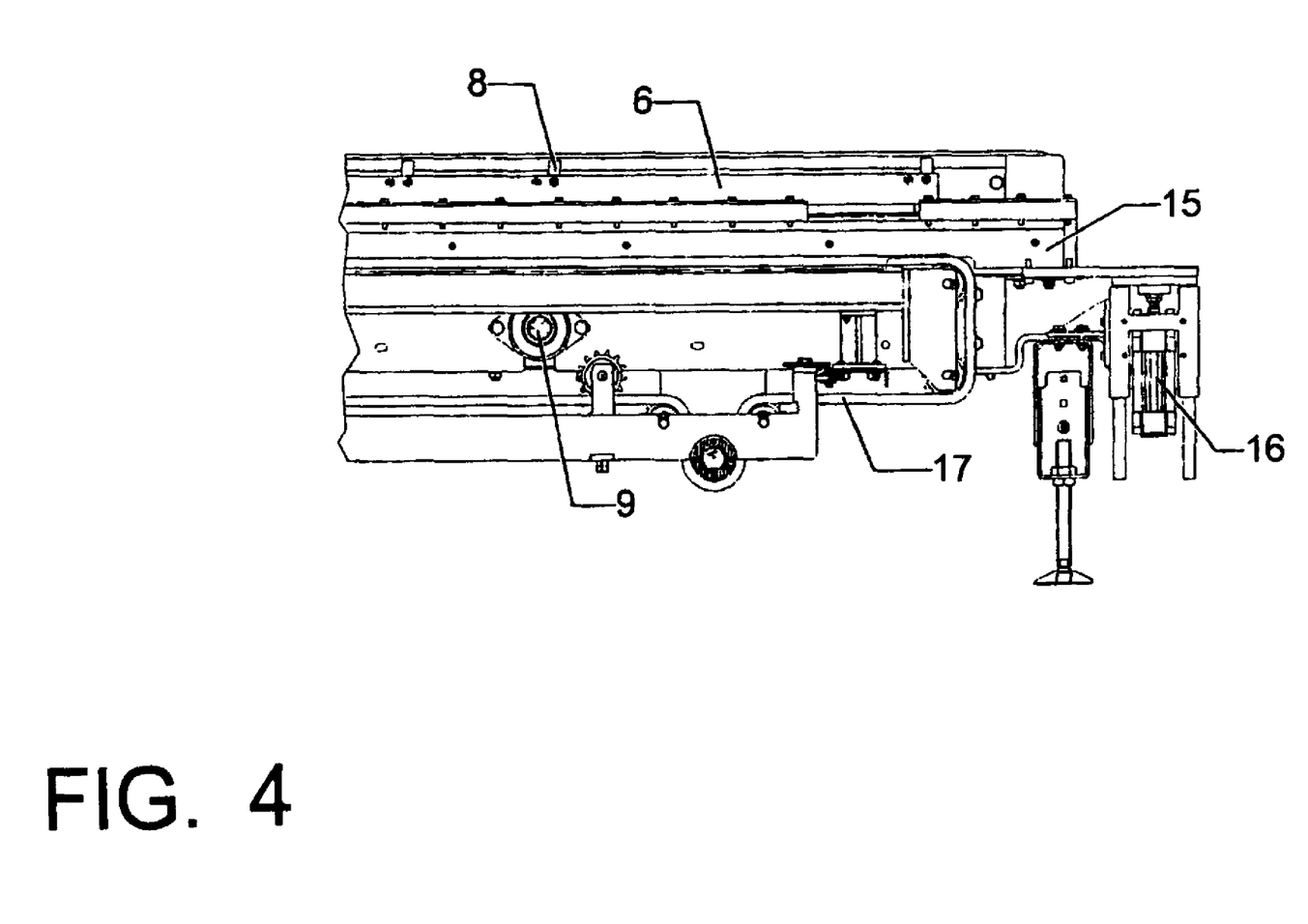
FIG. 4 is a detailed representation of the drive elements of the conveying section.

FIG. 4 shows the drive system of the conveying rod 6. The conveying rod is mounted on a carrier 15, which is raised and lowered by means of lifting cylinders 16. The conveying rod 6 is connected to a circulating conveying chain 17 by means of slotted entrainment means (not shown), said chain being driven clockwise and counter-clockwise by the servo motors 9.

At least one possible embodiment of the device and of the method according to the present application, a plurality of depalletizing devices 2 and loading stations 3 can be positioned in series, which leads to further acceleration of the loading process. It is possible to accelerate and brake the roll trucks 4 in a very careful manner through the conveying chain being driven by means of servo motors.

Figure 5:
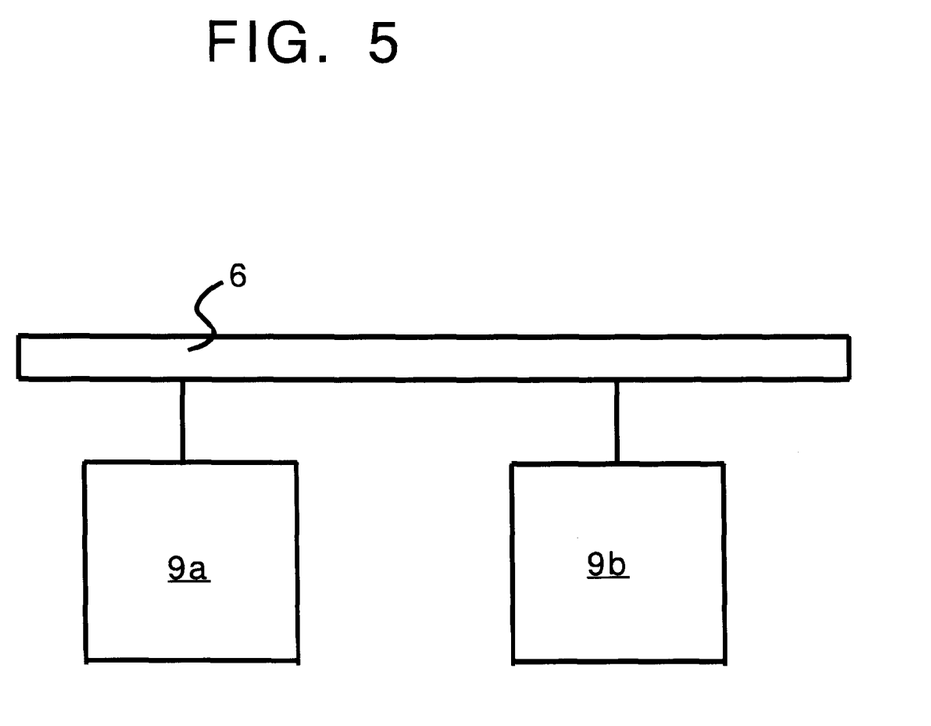
FIG. 5 is a block diagram representing one possible embodiment of a push bar or transport element of the present application.

FIG. 5 shows one possible embodiment of a push bar or conveying rod or transport element 6, which is configured for use with the apparatus of the present application. The transport element 6 may be configured to be moved in a lateral or horizontal direction by a motor 9a. The transport element 6 may also be configured to be moved in a vertical direction by a motor 9b.

In at least one possible embodiment of the present application, the push bar or conveying rod or transport element 6 may be configured to be moved in both the vertical and horizontal directions at the same time or substantially the same time, thereby possibly effecting either a clockwise or counter-clockwise movement of the transport element 6.

In at least one possible embodiment of the present application, the transport element or conveying rod or push bar 6 may be configured to be raised and lowered as well as be configured to moved in a lateral and/or horizontal direction. The transport element 6 may have a first, starting position. The transport element 6 may be raised in order to engage roll trucks 4 with entrainment means 8, for example engaging a first layer of roll trucks 4 in the depalletizing device 2. Once the roll trucks 4 are engaged by the entrainment means 8, the elevated push bar or transport element 6 may be moved in a lateral direction in order to transport the roll trucks 4 in a lateral direction, for example to transport the first layer of roll trucks 4 from the depalletizing device 2 to the transport or conveying section 7. After the roll trucks 4 are transported to the conveying section 7, the transport element or push bar 76 may be lowered, and the entrainment means 8 may be disengaged from the roll trucks 4. The lowered transport element 6 may then be moved back laterally, until the transport element 6 is in the first, starting position again.

Once the transport element 6 is in the first, starting position again, the process of rotating the transport element 6 may begin again. The transport element 6 may be raised, engaging both the roll trucks 4 in the transport or conveying section 7 and a new layer of roll trucks 4 in the depalletizing device 2. Upon the transport element 6 being raised and engaging the roll trucks 4, the transport element 6 may be moved laterally, moving the roll trucks 4 in the conveying section 7 to the loading station 3 and also moving the roll trucks 4 in the depalletizing device 2 to the transport and conveying section 7. This process may be repeated until the roll trucks 4 are moved from the loading station 3 to the transport pallets 12.

The present application relates to a loading device 3 and palletizing device for roll trucks 4, in one possible embodiment for so-called dollies, comprising at least one transport section having at least one guide rail, in which transport section roll trucks can be conveyed; one loading station for roll trucks in which wares can be loaded simultaneously or substantially simultaneously onto at least two roll trucks arranged in series; and one transfer station in which the fully loaded roll trucks are removed. A transport bar provided with carriers 8 is incorporated in the conveying section. The carriers are arranged on the transport bar in such a way that when moving under load, the carriers effect a defined separation between the roll trucks. The conveying bars can be in one possible embodiment raised and lowered with such a movement that the conveying bars are raised for the loading movement and execute a lowered return movement.

One feature or aspect of an embodiment is believed at the time of the filing of this patent application to possibly reside broadly in a loading and palletizing device for roll trucks, in one possible embodiment so-called dollies, said device comprising at least one transport section provided with at least one guide rail, in which roll trucks are displaceable, a loading station for roll trucks, in which goods can be stacked onto at least two roll trucks, one positioned behind the other, at the same time, and a transfer station in which the fully loaded roll trucks are removed, wherein the transfer station is in one possible embodiment formed by a palletizing station in which the roll trucks are positioned on at least one pallet, wherein a transport bar provided with entrainment means is provided in the conveying section, said transport bar being directly or indirectly in operative connection with a motor, pneumatic agitator, hydraulic agitator or the like and being driveable thereby, wherein the entrainment means are positioned on the transport bar in such a manner that said entrainment means cause a defined spacing between the roll trucks when moving loads.

Another feature or aspect of an embodiment is believed at the time of the filing of this patent application to possibly reside broadly in the device, wherein the conveying bar executes a raised load movement and a lowered return movement.

Yet another feature or aspect of an embodiment is believed at the time of the filing of this patent application to possibly reside broadly in the device, wherein the conveying rod is in operative connection with a chain that runs, in part, parallel or substantially parallel to the conveying rod, wherein the chain is motor-driven and drives the conveying rod.

Still another feature or aspect of an embodiment is believed at the time of the filing of this patent application to possibly reside broadly in the device, wherein the conveying rod is guided on rollers and/or in at least one rail or carrier.

A further feature or aspect of an embodiment is believed at the time of the filing of this patent application to possibly reside broadly in the device, wherein that the entrainment means are journals, claws or the like.

Another feature or aspect of an embodiment is believed at the time of the filing of this patent application to possibly reside broadly in the device, wherein at least part of the entrainment means is mounted eccentrically and is lowerable.

Yet another feature or aspect of an embodiment is believed at the time of the filing of this patent application to possibly reside broadly in the device, wherein the two or more transport sections extend parallel or substantially parallel and in one possible embodiment the number of the parallel or substantially parallel transport sections is such that in the associated loading station it is possible to load a number of roll trucks that fill out the area at least of one transport pallet in an optimum manner.

Still another feature or aspect of an embodiment is believed at the time of the filing of this patent application to possibly reside broadly in the device, wherein the two or more transport sections do not extend parallel or substantially parallel next to one another, but in the direction of the loading station are spaced further apart from one another than upstream of the loading station and in this manner a defined spacing between the roll trucks is effected in the region of the loading station, wherein the transport sections downstream of the loading station in one possible embodiment extend in a more narrow manner parallel or substantially parallel to each other.

A further feature or aspect of an embodiment is believed at the time of the filing of this patent application to possibly reside broadly in the device, wherein a depalletizing device is positioned upstream of the loading station and of the transport section, and said depalletizing device is in one possible embodiment suitable for the layerwise removal and transfer of roll trucks onto the adjacent transport section.

Another feature or aspect of an embodiment is believed at the time of the filing of this patent application to possibly reside broadly in the device, wherein the depalletizing device includes a lifting device, with which the second layer and where applicable further layers can be raised and lowered.

Yet another feature or aspect of an embodiment is believed at the time of the filing of this patent application to possibly reside broadly in the device, wherein the loading station includes a device, by means of which at least one stabilizing element and/or packaging material is secured on or to the goods, in one possible embodiment stabilizing elements and/or packaging materials that abut against at least one side of the goods from the outside.

Still another feature or aspect of an embodiment is believed at the time of the filing of this patent application to possibly reside broadly in a method for loading roll trucks, said method including the steps—conducting roll trucks to a loading station, loading the roll trucks in the loading station, removal therefrom, wherein a loading and palletizing device in accordance with the present application is used.

A further feature or aspect of an embodiment is believed at the time of the filing of this patent application to possibly reside broadly in the method, wherein the following steps are executed: (a) advance a pallet loaded with stacked roll trucks, (b) raise the stacked roll truck without the lowermost stack layer, (c) insert the at least one conveying rod under at least two roll trucks situated one behind the other, (d) engage or join at least one entrainment means in or to each roll truck, in one possible embodiment in or to the roll truck floors or frames, (e) load movement of the conveying rod and the roll truck locked thereto to the loading station, (f) parallel or substantially parallel loading of the roll trucks, and (g) load movement of the conveying rod and of the roll trucks locked thereto to a subsequent conveying section or transfer station.

One feature or aspect of an embodiment is believed at the time of the filing of this patent application to possibly reside broadly in the method, wherein in the step f), in addition, at least part of the outer faces of the goods stacked on the roll truck is covered with at least one stabilizing element and/or packaging material.

Another feature or aspect of an embodiment is believed at the time of the filing of this patent application to possibly reside broadly in the method, wherein in step c) two or more conveying rods move in under roll trucks standing one behind the other, wherein in one possible embodiment the conveying rods move in in parallel or substantially parallel and entrain a full layer of roll trucks.

One feature or aspect of an embodiment is believed at the time of the filing of this patent application to possibly reside broadly in a method of loading dollies with goods and loading loaded dollies onto pallets, said method comprising the steps of: advancing at least two stacks of dollies to a depalletizing station; lifting said at least two stacks of dollies without a lowermost stack layer of dollies in each of said at least two stacks in said depalletizing station and thereby leaving the lowermost dolly in each stack of dollies at said depalletizing station; raising a transport arrangement from a start position, which transport arrangement is disposed under said lowermost dolly in each stack of dollies and engaging said lowermost dolly in each stack of dollies with engaging means disposed on said transport arrangement; said transport arrangement comprising a push bar with a plurality of engaging means disposed on said push bar; each of said engaging means comprising at least one claw, each claw being configured to engage with one of said lowermost dolly in each stack of dollies; moving said transport arrangement in said direction of transport and advancing with said claws engaged with said at least two dollies from said depalletizing station to a loading station; upon said at least two dollies being advanced to said loading station, loading said at least two dollies with goods; and upon loading said at least two dollies with goods, advancing the loaded at least two dollies to a further station, which further station comprises a conveying section or transfer station.

Another feature or aspect of an embodiment is believed at the time of the filing of this patent application to possibly reside broadly in the method of loading dollies with goods and loading loaded dollies onto pallets, wherein said method further comprises returning said transport arrangement to said start position, upon advancing said loaded lowermost dolly in each stack of dollies to a further station.

Yet another feature or aspect of an embodiment is believed at the time of the filing of this patent application to possibly reside broadly in the method of loading dollies with goods and loading loaded dollies onto pallets, wherein said transport arrangement is operatively connected to a chain that runs, in part, substantially parallel to said transport arrangement, wherein said chain is motor-driven and drives said transport arrangement.

Still another feature or aspect of an embodiment is believed at the time of the filing of this patent application to possibly reside broadly in the method of loading dollies with goods and loading loaded dollies onto pallets, wherein said transport arrangement is guided on rollers and/or in at least one rail or carrier.

A further feature or aspect of an embodiment is believed at the time of the filing of this patent application to possibly reside broadly in the method of loading dollies with goods and loading loaded dollies onto pallets, wherein: at least part of said engaging means is mounted eccentrically on said transport arrangement and is lowerable; said step of moving said transport arrangement in said direction of transport and advancing said lowermost dolly in each stack of dollies from said depalletizing station to a loading station further comprises: moving said transport arrangement in said direction of transport and advancing said lowermost dolly in each stack of dollies from said depalletizing station to a transport station; and moving said transport arrangement in said direction of transport and advancing said lowermost dolly in each stack of dollies from said transport station to said loading station; said method further comprises: utilizing a plurality of depalletizing stations and a plurality of transport arrangements to advance a plurality of dollies to a plurality of transport stations; and loading said plurality of dollies with goods in said loading station, which plurality of dollies is configured to fill at least one transport pallet; one of (A) and (B): (A) said plurality of transport stations is configured and disposed to extend substantially parallel to one another; and (B) said plurality of transport stations is configured and disposed to extend substantially transverse to one another; said loading station comprises a device, by means of which at least one of: stabilizing elements and packaging material is secured on or to said goods; said at least one of: said stabilizing elements and said packaging material is configured to abut against at least one side of said goods from the outside; and said step of loading said lowermost dolly in each stack of dollies with goods further comprises covering said outer faces of said goods loaded on said lowermost dolly in each stack of dollies with at least one of: said stabilizing elements and packaging material.

Another feature or aspect of an embodiment is believed at the time of the filing of this patent application to possibly reside broadly in a method of loading dollies with goods and loading loaded dollies onto pallets, said method comprising the steps of: advancing at least two stacks of dollies to a depalletizing station; lifting said at least two stacks of dollies without a lowermost stack layer of dollies in each of said at least two stacks in said depalletizing station and thereby leaving the lowermost dolly in each stack of dollies at said depalletizing station; raising a transport arrangement from a start position, which transport arrangement is disposed under said lowermost dolly in each stack of dollies and engaging said lowermost dolly in each stack of dollies with engaging means disposed on said transport arrangement; moving said transport arrangement in said direction of transport and advancing said lowermost dolly in each stack of dollies from said depalletizing station to a loading station; upon said lowermost dolly in each stack of dollies being advanced to said loading station, loading said lowermost dolly in each stack of dollies with goods; and upon loading said lowermost dolly in each stack of dollies with goods, advancing the loaded lowermost dolly in each stack of dollies to a further station.

Yet another feature or aspect of an embodiment is believed at the time of the filing of this patent application to possibly reside broadly in a loading arrangement for performing the method of loading dollies with goods and loading loaded dollies onto pallets, said loading arrangement comprising: a first advancing arrangement being configured to advance at least two stacks of dollies to a depalletizing station; a lifting arrangement being configured to lift at least two stacks of dollies without a lowermost stack layer of dollies in each of the at least two stacks in said depalletizing station and being configured to leave the lowermost dolly in each stack of dollies at said depalletizing station; a raising arrangement being configured to raise a transport arrangement from a start position, which transport arrangement is configured to be disposed under the lowermost dolly in each stack of dollies at said depalletizing station and engaging the lowermost dolly in each stack of dollies with engaging means disposed on said transport arrangement; a moving arrangement being configured to move said transport arrangement in a direction of transport and to advance the lowermost dolly in each stack of dollies from said depalletizing station to a loading station; a loading arrangement being configured to load, upon the lowermost dolly in each stack of dollies being advanced to said loading station, the lowermost dolly in each stack of dollies with goods; and a second advancing arrangement being configured to advance, upon loading of the lowermost dolly in each stack of dollies with goods, at said loading station, the loaded lowermost dolly in each stack of dollies to a further station.

Still another feature or aspect of an embodiment is believed at the time of the filing of this patent application to possibly reside broadly in means for performing the method of loading dollies with goods and loading loaded dollies onto pallets, said means comprising: means for advancing at least two stacks of dollies to a depalletizing station; means for lifting at least two stacks of dollies without a lowermost stack layer of dollies in each of the at least two stacks in said depalletizing station and leaving the lowermost dolly in each stack of dollies at said depalletizing station; means for raising a transport arrangement from a start position, which transport arrangement is configured to be disposed under the lowermost dolly in each stack of dollies at said depalletizing station and engaging the lowermost dolly in each stack of dollies with engaging means disposed on said transport arrangement; means for moving said transport arrangement in a direction of transport and advancing the lowermost dolly in each stack of dollies from said depalletizing station to a loading station; means for, upon the lowermost dolly in each stack of dollies being advanced to said loading station, loading the lowermost dolly in each stack of dollies with goods; and means for, upon loading of the lowermost dolly in each stack of dollies with goods, at said loading station, advancing the loaded lowermost dolly in each stack of dollies to a further station.

A further feature or aspect of an embodiment is believed at the time of the filing of this patent application to possibly reside broadly in the method of loading dollies with goods and loading loaded dollies onto pallets, wherein said method further comprises returning said transport arrangement to said start position, upon advancing said loaded lowermost dolly in each stack of dollies to a further station.

Another feature or aspect of an embodiment is believed at the time of the filing of this patent application to possibly reside broadly in the method of loading dollies with goods and loading loaded dollies onto pallets, wherein said transport arrangement is operatively connected to a chain that runs, in part, substantially parallel to said transport arrangement, wherein said chain is motor-driven and drives said transport arrangement.

Yet another feature or aspect of an embodiment is believed at the time of the filing of this patent application to possibly reside broadly in the method of loading dollies with goods and loading loaded dollies onto pallets, wherein said transport arrangement is guided on rollers and/or in at least one rail or carrier.

Still another feature or aspect of an embodiment is believed at the time of the filing of this patent application to possibly reside broadly in the method of loading dollies with goods and loading loaded dollies onto pallets, wherein said engaging means comprise at least one of: journals, claws or the like.

A further feature or aspect of an embodiment is believed at the time of the filing of this patent application to possibly reside broadly in the method of loading dollies with goods and loading loaded dollies onto pallets, wherein at least part of said engaging means is mounted eccentrically on said transport arrangement and is lowerable.

One feature or aspect of an embodiment is believed at the time of the filing of this patent application to possibly reside broadly in the method of loading dollies with goods and loading loaded dollies onto pallets, wherein: said step of moving said transport arrangement in said direction of transport and advancing said lowermost dolly in each stack of dollies from said depalletizing station to a loading station further comprises: moving said transport arrangement in said direction of transport and advancing said lowermost dolly in each stack of dollies from said depalletizing station to a transport station; and moving said transport arrangement in said direction of transport and advancing said lowermost dolly in each stack of dollies from said transport station to said loading station; said method further comprises: utilizing a plurality of depalletizing stations and a plurality of transport arrangements to advance a plurality of dollies to a plurality of transport stations; and loading said plurality of dollies with goods in said loading station, which plurality of dollies is configured to fill at least one transport pallet.

Another feature or aspect of an embodiment is believed at the time of the filing of this patent application to possibly reside broadly in the method of loading dollies with goods and loading loaded dollies onto pallets, wherein: one of (A) and (B): (A) said plurality of transport stations is configured and disposed to extend substantially parallel to one another; and (B) said plurality of transport stations is configured and disposed to extend substantially transverse to one another; said loading station comprises a device, by means of which at least one of: stabilizing elements and packaging material is secured on or to said goods; said at least one of: said stabilizing elements and said packaging material is configured to abut against at least one side of said goods from the outside; and said step of loading said lowermost dolly in each stack of dollies with goods further comprises covering said outer faces of said goods loaded on said lowermost dolly in each stack of dollies with at least one of: said stabilizing elements and packaging material.

Yet another feature or aspect of an embodiment is believed at the time of the filing of this patent application to possibly reside broadly in a loading arrangement for performing the method of loading dollies with goods and loading loaded dollies onto pallets, said loading arrangement comprising: a first advancing arrangement being configured to advance at least two stacks of dollies to a depalletizing station; a lifting arrangement being configured to lift at least two stacks of dollies without a lowermost stack layer of dollies in each of the at least two stacks in said depalletizing station and being configured to leave the lowermost dolly in each stack of dollies at said depalletizing station; a raising arrangement being configured to raise a transport arrangement from a start position, which transport arrangement is configured to be disposed under the lowermost dolly in each stack of dollies at said depalletizing station and engaging the lowermost dolly in each stack of dollies with engaging means disposed on said transport arrangement; a moving arrangement being configured to move said transport arrangement in a direction of transport and to advance the lowermost dolly in each stack of dollies from said depalletizing station to a loading station; a loading arrangement being configured to load, upon the lowermost dolly in each stack of dollies being advanced to said loading station, the lowermost dolly in each stack of dollies with goods; and a second advancing arrangement being configured to advance, upon loading of the lowermost dolly in each stack of dollies with goods, at said loading station, the loaded the lowermost dolly in each stack of dollies to a further station.

Still another feature or aspect of an embodiment is believed at the time of the filing of this patent application to possibly reside broadly in the loading arrangement, wherein said transport arrangement is further configured to return to a start position, upon advancing a loaded lowermost dolly in each stack of dollies to a further station.

A further feature or aspect of an embodiment is believed at the time of the filing of this patent application to possibly reside broadly in the loading arrangement, wherein said transport arrangement is operatively connected to a chain that runs, in part, substantially parallel to said transport arrangement, wherein said chain is motor-driven and drives said transport arrangement.

Another feature or aspect of an embodiment is believed at the time of the filing of this patent application to possibly reside broadly in the loading arrangement, wherein said transport arrangement is configured to be guided on rollers and/or in at least one rail or carrier.

Yet another feature or aspect of an embodiment is believed at the time of the filing of this patent application to possibly reside broadly in the loading arrangement, wherein: said engaging means comprise at least one of: journals, claws or the like; at least part of said engaging means is mounted eccentrically on said transport arrangement and is lowerable; said moving arrangement is further configured to move said transport arrangement in a direction of transport and advance a lowermost dolly in each stack of dollies from said depalletizing station to a transport station; said moving arrangement is further configured to move said transport arrangement in a direction of transport and advance a lowermost dolly in each stack of dollies from said transport station to said loading station; said loading arrangement comprises a plurality of depalletizing stations and a plurality of transport arrangements configured to advance a plurality of dollies to a plurality of transport stations; said loading arrangement is configured to load a plurality of dollies with goods in said loading station, which plurality of dollies is configured to fill at least one transport pallet; one of (A) and (B): (A) said plurality of transport stations is configured and disposed to extend substantially parallel to one another; and (B) said plurality of transport stations is configured and disposed to extend substantially transverse to one another; said loading station comprises a device, by means of which at least one of: stabilizing elements and packaging material is secured on or to said goods; at least one of: the stabilizing elements and a packaging material is configured to abut against at least one side of the goods from the outside; and said loading arrangement is further configured to cover the outer faces of the goods loaded on a lowermost dolly in each stack of dollies with at least one of: stabilizing elements and packaging material.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The following patents, patent applications or patent publications, are hereby incorporated by reference as if set forth in their entirety herein: DE 0 251 439 A2, following the German title "Schraubstock, Feilkloben u. dgl. mit drehbaren Backen," issued on Jan. 10, 1912.

All of the patents, patent applications or patent publications, which were cited in the German Office Action dated Nov. 29, 2007, and/or cited elsewhere are hereby incorporated by reference as if set forth in their entirety herein as follows: U.S. Pat. No. 3,934,736, having the title "SPRING STACKER," published on Jan. 27, 1976; and DE 34 42 111, having the following English translation of the German title "Apparatus for manipulating rolling pallettes in shelving," published on Jul. 10, 1986.

All of the patents, patent applications or patent publications, which were cited in the International Search Report dated Jun. 18, 2008, and/or cited elsewhere are hereby incorporated by reference as if set forth in their entirety herein as follows: U.S. Pat. No. 5,195,630, having the title "CURVED RATCHET CONVEYOR," published on Mar. 23, 1993; EP 1,149,753, having the following English translation of the German title "Transport cart," published on Oct. 31, 2001; EP 0 251 439, having the title "Plastic dolly," published on Jan. 7, 1988; and U.S. Pat. No. 4,567,979, having the title "CAM FOLLOWER ASSEMBLY FOR INDEXING CONVEYORS," is published on Feb. 4, 1986.

Some examples of servo-motors that may possibly be utilized or possibly adapted for use in at least one possible embodiment of the present application may possibly be found in the following U.S. patents: U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025,684 issued to Yasui on Feb. 15, 2000.

Some examples of depalletizers and/or methods for depalletizing, which may possibly be utilized or adapted for use with at least one possible embodiment of the present application, may possibly be found in the following U.S. patents: U.S. Pat. No. 6,379,106, having the title "Depalletizing machine," published on Apr. 30, 2002; U.S. Pat. No. 6,332,750, having the title "Method and apparatus for depalletizing commodities," published on Dec. 25, 2001; U.S. Pat. No. 6,089,819, having the title "Method and apparatus for palletizing and depalletizing layers of articles on stackable pallets," published on Jul. 18, 2000; U.S. Pat. No. 5,913,655, having the title "Automatic depalletizing system and method," published on Jun. 22, 1999; U.S. Pat. No. 5,310,307, having the title "Depalletizing device and method," published on May 10, 1994; U.S. Pat. No. 4,109,802, having the title "Depalletizing apparatus," published on Aug. 29, 1978; and U.S. Pat. No. 4,106,635, having the title "Elevatable depalletizing system," published on Aug. 15, 1978.

Some examples of palletizers and/or methods of palletizing, which may possibly be utilized or adapted for use with at least one possible embodiment of the present application, may possibly be found in the following U.S. patents: U.S. Pat. No. 6,817,829, having the title "Work loading method for automatic palletizer, work loading method, work loading apparatus and attachment replacing method thereof," published on Nov. 16, 2004; U.S. Pat. No. 6,658,816, having the title "Bulk palletizer system," published on Dec. 9, 2003; U.S. Pat. No. 5,961,275, having the title "Palletizer and palletizing methods," published on Oct. 5, 1999; U.S. Pat. No. 5,525,029, having the title "Palletizer having vertically movable pallet supports and at least one gripper only in a horizontal plane," published on Jun. 11, 1996; U.S. Pat. No. 5,395,209, having the title "Palletizer," published on Mar. 7, 1995; and U.S. Pat. No. 5,261,781, having the title "Nov. 12, 1993.

Some examples of methods and apparatus for loading dollies or similar arrangements, which may possibly be utilized or adapted for use with at least one possible embodiment of the present application, may possibly be found in the following U.S. patents: U.S. Pat. No. 6,698,990, having the title "Loading and unloading installation for general cargo, especially for ISO containers," published on Mar. 2, 2004; U.S. Pat. No. 7,427,185, having the title "Method and apparatus for loading stacks of cartons of frozen animal products onto vessels using a carrier," published on Sep. 23, 2008; and U.S. Pat. No. 6,537,015, having the title "Container loading and unloading apparatus," published on Mar. 25, 2003.

The patents, patent applications, and patent publication listed above in the preceding seven paragraphs are herein incorporated by reference as if set forth in their entirety. The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2007 015 751.9, filed on Mar. 30, 2007, having inventors Martin RÜBSAAMEN and Joachim JUNGHANS, and DE-OS 10 2007 015 and DE-PS 10 2007 015 751.9, and International Application No. PCT/EP2008/002176, filed on Mar. 19, 2008, having WIPO Publication No. WO 2008/119468 and inventors Martin RÜBSAAMEN and Joachim JUNGHANS, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the corresponding foreign equivalent patent application(s), that is, PCT/EP2008/002176 and German Patent Application 10 2007 015 751.9, is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2008/002176 and DE 10 2007 015 751.9 from which this patent application claims priority which do not have to do with the correction of the translation in this patent application are not to be included in this patent application in the incorporation by reference.

Any statements about admissions of prior art in the original foreign patent applications PCT/EP2008/002176 and DE 10 2007 015 751.9 are not to be included in this patent application in the incorporation by reference, since the laws relating to prior art in non-U.S. Patent Offices and courts may be substantially different from the Patent Laws of the United States.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A loading arrangement for loading dollies comprising:
a transport station configured to place at least two dollies one behind another along their line of transport;
a loading station configured to load the at least two dollies with goods at essentially the same time;
a transfer station configured to transfer loaded dollies out of the loading arrangement; and
a movable transport element comprising engaging structures, which engaging structures are configured to: engage and move the at least two dollies to position the at least two dollies at a predetermined distance from one another at said loading station, and move the at least two dollies to said transfer station upon completion of loading with goods; wherein said transfer station comprises a palletizing station configured to transfer at least two dollies onto a pallet.

2. The loading arrangement according to claim 1, wherein said transport element is configured to be raised to permit engaging and moving of at least two dollies, and to be lowered to permit transfer of the at least two dollies onto a pallet.

3. The loading arrangement according to claim 2, wherein:
said transport element comprises a conveying rod; and
the loading arrangement comprises a motor-driven chain operatively connected to said conveying rod to drive said conveying rod, at least a portion of which chain is disposed parallel to said conveying rod.

4. The loading arrangement according to claim 3, wherein said transport station is configured to hold a supply of dollies in at least two stacks, and is configured to move at least two dollies from the at least two stacks for transport by said conveying rod.

5. A method of loading dollies comprising the steps of:
placing at least two dollies one behind another along their line of transport at a transport station;
engaging said at least two dollies with engaging structures of a movable transport element;
moving said at least two dollies to a loading station and using said engaging structures to position said at least two dollies at a predetermined distance from one another;
loading said at least two dollies with goods at essentially the same time;
moving said at least two dollies to a transfer station, wherein said transfer station comprises a palletizing station configured; the method further comprises transferring said at least two dollies onto a pallet.

6. The method according to claim 5, wherein said method further comprises raising said transport element to engage and move said at least two dollies, and lowering said transport element to permit transferring of the at least two dollies onto a pallet.

7. The method according to claim 6, wherein:
said transport element comprises a conveying rod; and
the loading arrangement comprises a motor-driven chain operatively connected to said conveying rod to drive said conveying rod, at least a portion of which chain is disposed parallel to said conveying rod.

8. The method according to claim 7, wherein said method further comprises guiding said conveying rod with a guiding structure.

9. The method according to claim 7, wherein said step of engaging said at least two dollies with engaging structures comprises engaging said at least two dollies with journals, claws, or similar structures.

10. The method according to claim 7, wherein said method further comprises eccentrically rotating and lowering a portion of said engaging structures and moving said conveying rod back to said transport station.

11. The method according to claim 7, wherein said method further comprises moving at least two parallel lines of said at least two dollies to said loading station, and said step of transferring said at least two dollies onto a pallet comprises transferring a number of dollies sufficient to sufficiently fill the area of a pallet.

12. The method according to claim 7, wherein said method further comprises moving at least two lines of said at least two dollies together upstream of said loading station, then further apart at said loading station to effect a defined spacing between said at least two dollies at said loading station, and then closer together downstream of said loading station.

13. The method according to claim 7, wherein said method further comprises securing at least one stabilizing element and/or packaging material on or to the goods at said loading station, which said at least one stabilizing element and/or packaging material are configured to abut against at least one side of the goods from the outside.

14. The method according to claim 7, wherein said step of placing at least two dollies one behind another along their line of transport at a transport station comprises lifting at least two stacks of dollies without the lowermost layer.

15. The method according to claim 14, wherein said step of engaging said at least two dollies with engaging structures of a movable transport element comprises engaging the floors or frames of said at least two dollies.

16. The method according to claim 15, wherein said method further comprises at least partially covering the outer faces of the goods with at least one stabilizing element and/or packaging material at said loading station.

17. The method according to claim 16, wherein said method further comprises engaging said at least two dollies with engaging structures of at least two transport elements positioned one behind the other and moving said at least two transport elements in parallel.

18. The method according to claim 5, wherein said predetermined distance comprises a distance sufficient to permit at least two lifting tools to load at least two dollies at the same time.

* * * * *